(12) United States Patent
Cheng et al.

(10) Patent No.: US 7,266,120 B2
(45) Date of Patent: Sep. 4, 2007

(54) SYSTEM AND METHOD FOR HARDWARE ACCELERATED PACKET MULTICAST IN A VIRTUAL ROUTING SYSTEM

(75) Inventors: Joseph Cheng, Sunnyvale, CA (US); Zahid Hussain, San Jose, CA (US); Tim Millet, Mountain View, CA (US)

(73) Assignee: Fortinet, Inc., Sunnyvale, CA (US)

( * ) Notice: Subject to any disclaimer, the term of this patent is extended or adjusted under 35 U.S.C. 154(b) by 1056 days.

(21) Appl. No.: 10/298,815

(22) Filed: Nov. 18, 2002

(65) Prior Publication Data

US 2004/0095934 A1 May 20, 2004

(51) Int. Cl.
*H04L 12/28* (2006.01)
*H04L 12/56* (2006.01)

(52) U.S. Cl. ........................ 370/390; 370/392
(58) Field of Classification Search ............... None
See application file for complete search history.

(56) References Cited

U.S. PATENT DOCUMENTS

| | | | |
|---|---|---|---|
| 4,667,287 A | 5/1987 | Allen et al. | |
| 5,400,331 A | 3/1995 | Lucak et al. | |
| 5,473,599 A | 12/1995 | Li et al. | |
| 5,490,252 A | 2/1996 | Macera et al. | |
| 5,581,705 A | 12/1996 | Passint et al. | |
| 5,606,668 A | 2/1997 | Shwed | |
| 5,633,866 A | 5/1997 | Callon | |
| 5,745,778 A | 4/1998 | Alfieri | |
| 5,825,772 A | 10/1998 | Dobbins et al. | |
| 5,835,726 A | 11/1998 | Shwed et al. | |
| 5,841,973 A | 11/1998 | Kessler et al. | |
| 5,875,290 A | 2/1999 | Bartfai et al. | |
| 5,963,555 A | 10/1999 | Takase et al. | |
| 5,987,521 A | 11/1999 | Arrowood et al. | |
| 6,014,382 A | 1/2000 | Takihiro et al. | |
| 6,032,193 A | 2/2000 | Sullivan | |
| 6,047,330 A | 4/2000 | Stracke | |
| 6,069,895 A | 5/2000 | Ayandeh | |
| 6,085,238 A | 7/2000 | Yuasa et al. | ................. 709/223 |

(Continued)

FOREIGN PATENT DOCUMENTS

WO  0051290  8/2000

(Continued)

OTHER PUBLICATIONS

European Search Report for PCT/US 03/37009, (Jul. 4, 2004), 2 pages.

(Continued)

*Primary Examiner*—Wing Chan
*Assistant Examiner*—Ronald Abelson
(74) *Attorney, Agent, or Firm*—Hamilton, Desanctis & Cha, LLP

(57) ABSTRACT

A packet-forwarding engine (PFE) of a multiprocessor system uses an array of flow classification block (FCB) indices to multicast a packet. Packets are received and buffered in external memory. In one embodiment, when a multicast packet is identified, a bit is set in a packet descriptor and an FCB index is generated and sent with a null-packet to the egress processors which generate multiple descriptors with different indices for each instance of multicasting. All the descriptors may point to the same buffer in the external memory, which stores the multicast packet. A DMA engine reads from the same buffer multiple times and egress processors may access an appropriate transform control block (TCB) index so that the proper headers may be installed on the outgoing packet. The buffer may be released after the last time the packet is read by setting a particular bit of the FCB index.

72 Claims, 6 Drawing Sheets

U.S. PATENT DOCUMENTS

| | | | |
|---|---|---|---|
| 6,098,110 A | 8/2000 | Witowski et al. | |
| 6,118,791 A | 9/2000 | Fichou et al. | |
| 6,137,777 A | 10/2000 | Vaid et al. | |
| 6,147,976 A | 11/2000 | Shand et al. | |
| 6,169,739 B1 | 1/2001 | Isoyama | |
| 6,169,793 B1 | 1/2001 | Gowdin et al. | |
| 6,173,333 B1 | 1/2001 | Jolitz et al. | |
| 6,175,867 B1 | 1/2001 | Taghadoss | |
| 6,192,051 B1 | 2/2001 | Lipman et al. | 370/389 |
| 6,220,768 B1 | 4/2001 | Barroux | |
| 6,226,788 B1 | 5/2001 | Schoening et al. | |
| 6,243,580 B1 | 6/2001 | Garner | |
| 6,249,519 B1 | 6/2001 | Rangachar | |
| 6,260,072 B1 | 7/2001 | Rodriguez | |
| 6,260,073 B1 | 7/2001 | Walker et al. | |
| 6,266,695 B1 | 7/2001 | Huang et al. | |
| 6,278,708 B1 | 8/2001 | Von Hammerstein et al. | |
| 6,286,038 B1 | 9/2001 | Reichmeyer et al. | |
| 6,295,297 B1 | 9/2001 | Lee | |
| 6,298,130 B1 | 10/2001 | Galvin | |
| 6,304,975 B1 | 10/2001 | Shipley | |
| 6,320,859 B1 | 11/2001 | Momirov | |
| 6,330,602 B1 | 12/2001 | Law et al. | |
| 6,338,092 B1 | 1/2002 | Chao et al. | |
| 6,405,262 B1 | 6/2002 | Vogel et al. | |
| 6,414,595 B1 | 7/2002 | Scrandis et al. | |
| 6,434,619 B1 | 8/2002 | Lim et al. | |
| 6,449,650 B1 | 9/2002 | Westfall et al. | |
| 6,463,061 B1 | 10/2002 | Rekhter et al. | |
| 6,466,976 B1 | 10/2002 | Alles et al. | |
| 6,496,935 B1 | 12/2002 | Fink et al. | |
| 6,526,056 B1 | 2/2003 | Rekhter et al. | |
| 6,532,088 B1 | 3/2003 | Dantu | |
| 6,542,466 B1 | 4/2003 | Pashtan et al. | |
| 6,549,954 B1 * | 4/2003 | Lambrecht et al. | 719/315 |
| 6,556,544 B1 | 4/2003 | Lee | |
| 6,606,315 B1 | 8/2003 | Albert et al. | |
| 6,608,816 B1 | 8/2003 | Nichols | |
| 6,636,516 B1 | 10/2003 | Yamano | |
| 6,639,897 B1 | 10/2003 | Shiomoto et al. | |
| 6,658,013 B1 | 12/2003 | de Boer et al. | |
| 6,697,359 B1 | 2/2004 | George | |
| 6,697,360 B1 | 2/2004 | Gai et al. | |
| 6,738,371 B1 | 5/2004 | Ayres | |
| 6,775,267 B1 | 8/2004 | Kung | |
| 6,775,284 B1 | 8/2004 | Calvignac et al. | |
| 6,868,082 B1 | 3/2005 | Allen et al. | |
| 6,883,170 B1 | 4/2005 | Garcia | |
| 6,901,517 B1 | 5/2005 | Redmore | |
| 6,938,095 B2 | 8/2005 | Basturk et al. | |
| 6,938,097 B1 | 8/2005 | Vincent | |
| 6,944,128 B2 | 9/2005 | Nichols | |
| 6,944,168 B2 | 9/2005 | Paatela et al. | |
| 6,954,429 B2 | 10/2005 | Horton et al. | |
| 6,985,438 B1 | 1/2006 | Tschudin | |
| 6,999,454 B1 | 2/2006 | Crump | |
| 7,020,143 B2 | 3/2006 | Zdan | |
| 7,039,053 B1 | 5/2006 | Freed et al. | |
| 7,042,843 B2 | 5/2006 | Ni | |
| 7,042,848 B2 | 5/2006 | Santiago et al. | |
| 7,161,904 B2 | 1/2007 | Hussain | |
| 7,203,192 B2 | 4/2007 | Desai | |
| 2001/0043571 A1 | 11/2001 | Jang et al. | |
| 2001/0048661 A1 | 12/2001 | Clear et al. | |
| 2001/0052013 A1 | 12/2001 | Munguia et al. | |
| 2002/0062344 A1 | 5/2002 | Yionen et al. | |
| 2002/0066034 A1 | 5/2002 | Schlossberg et al. | |
| 2002/0075901 A1 | 6/2002 | Perlmutter et al. | |
| 2002/0097872 A1 | 7/2002 | Barbas et al. | |
| 2002/0099849 A1 | 7/2002 | Alfieri et al. | |
| 2002/0126672 A1 | 9/2002 | Chow et al. | |
| 2002/0152373 A1 | 10/2002 | Sun et al. | |
| 2002/0186661 A1 | 12/2002 | Santiago et al. | |
| 2002/0188657 A1 | 12/2002 | Traversat et al. | |
| 2002/0191604 A1 | 12/2002 | Mitchell et al. | |
| 2003/0033401 A1 | 2/2003 | Poisson et al. | |
| 2003/0043792 A1 | 3/2003 | Carpini et al. | |
| 2003/0081559 A1 * | 5/2003 | Matuoka et al. | 370/252 |
| 2003/0091021 A1 * | 5/2003 | Trossen et al. | 370/349 |
| 2003/0108041 A1 | 6/2003 | Aysan | |
| 2003/0115308 A1 | 6/2003 | Best et al. | |
| 2003/0117954 A1 | 6/2003 | De Neve et al. | |
| 2003/0131228 A1 | 7/2003 | Twomey | |
| 2003/0169747 A1 | 9/2003 | Wang | |
| 2003/0185226 A1 | 10/2003 | Tang et al. | |
| 2003/0200295 A1 | 10/2003 | Roberts et al. | |
| 2003/0212735 A1 | 11/2003 | Hickok et al. | |
| 2003/0223361 A1 * | 12/2003 | Hussain et al. | 370/230 |
| 2003/0223406 A1 | 12/2003 | Balay | |
| 2003/0223418 A1 | 12/2003 | Desai et al. | |
| 2003/0223456 A1 | 12/2003 | DiMambro | |
| 2004/0042416 A1 | 3/2004 | Ngo et al. | |
| 2004/0095934 A1 | 5/2004 | Cheng et al. | |
| 2004/0141521 A1 | 7/2004 | George | |
| 2004/0160900 A1 | 8/2004 | Lund et al. | |
| 2004/0199567 A1 | 10/2004 | Lund | |
| 2004/0199568 A1 | 10/2004 | Lund | |
| 2004/0199569 A1 | 10/2004 | Kalkunte et al. | |
| 2005/0188106 A1 | 8/2005 | Pirbhai et al. | |
| 2006/0087969 A1 | 4/2006 | Santiago et al. | |
| 2006/0140185 A1 | 6/2006 | Norman et al. | |

FOREIGN PATENT DOCUMENTS

| | | |
|---|---|---|
| WO | 0076152 | 12/2000 |
| WO | 0163809 | 8/2001 |
| WO | WO-0163809 A1 | 8/2001 |
| WO | 0223855 | 3/2002 |
| WO | 03010323 | 12/2003 |

OTHER PUBLICATIONS

Chan, Mun C. et al., "An architecture for broadband virtual networks under customer control." IEEE Network Operations and Management Symposium. Apr. 1996. pp. 135-144.

Chan, Mun C. et al "Customer Management and Control of Broadband VPN Services." Proc. Fifth IFIP/IEEE International Symposium of Integrated Network Management. May 1997. pp. 301-314.

Gasparro, D.M., "Next-Gen VPNs: The Design Challenge." Data Communications. Sep. 1999. pp. 83-95.

Hanaki, M. et al., "LAN/WAN management integration using ATM CNM interface." IEEE Network Operations Management Symposium, vol. 1. Apr. 1996. pp. 12-21.

Kapustka, S., "CoSine Communications Move VPNs 'Into the Cloud' with the Leading Managed IP Service Delivery Platform." http://wwwcosinecom.com/news/pr_5_24.html. Press Release, CoSine Communications. 1995. p. 5.

Keshav, S., "An Engineering Approach to Computer Networking: ATM networks, the internet, and the telephone network." Reading Mass: Addison-Wesley, Addison-Wesley Professional Computing Series. 1992. pp. 318-324.

Kim, E.C. et al., "The Multi-Layer VPN Management Architecture." Proc. Sixth IFIP/IEEE International Symposium on Integrated Network Management. May 1999. pp. 187-200.

Rao, J.R., Intranets and VPNs: Strategic Approach. 1988 Annual Review of Communications. 1998. pp. 669-674.

Tanenbaum, A.S., "Computer Networks." Upper Saddle River, N.J.: Prentice Hall PTR, 3rd Edition. 1996. pp. 348-364.

European Search Report for PCT/US03/37009 (Jul. 4, 2004) 2 pgs.

International Search Report for PCTUS03/17674. 6 pgs.

* cited by examiner

SYSTEM AND METHOD FOR HARDWARE ACCELERATED PACKET MULTICAST IN A VIRTUAL ROUTING SYSTEM

CROSS-REFERENCE TO RELATED APPLICATIONS

This application is related to U.S. patent application entitled "System and Method for Routing Traffic through a Virtual Router-Based Network Switch", filed Jun. 04, 2002, application Ser. No. 10/163,079, now U.S. Pat. No. 7,177,311 which is assigned to the same assignee as the present application and which is hereby incorporated by reference.

TECHNICAL FIELD

The present invention pertains to data communications, and in particular to network routing and routing systems, and more particularly to packet multicasting.

BACKGROUND

Conventional routing systems generally perform packet multicasting in a single routing context using a single multicast address space. With this approach, supporting various multicast features for different customers may require the use of a separate router for each customer. This approach may also prevent users from taking advantage of packet multicasting resources available from multiple routing contexts with private and potentially overlapping address spaces.

Thus there is a need for an improved virtual routing system and method for packet multicasting. There is also a need for an improved packet multicasting system and method. There is also a need for a virtual routing system and method that takes advantage of multiple routing contexts allowing a service provider to support multicast features for many different access clients with a single piece of hardware.

SUMMARY OF THE INVENTION

In one embodiment, the present invention provides for hardware-accelerated packet multicasting. A packet-forwarding engine (PFE) of a multiprocessor system uses an array of flow classification block (FCB) indices to multicast a packet. Packets are received and buffered in external memory. In one embodiment, when a multicast packet is identified, a bit is set in a packet descriptor and an FCB index is generated and sent with a null-packet to the egress processors which generate multiple descriptors with different indices for each instance of multicasting. All the descriptors may point to the same buffer in the external memory, which stores the multicast packet. A DMA engine reads from the same buffer multiple times and egress processors may access an appropriate transform control block (TCB) index so that the proper headers may be installed on the outgoing packet. The buffer may be released after the last time the packet is read by setting a particular bit of the FCB index.

In another embodiment, a virtual routing system supports a plurality of virtual routers (VRs) instantiated by a virtual routing engine (VRE). In this embodiment, the instantiation of each VR includes an associated routing context. The virtual routing system may perform a method of multicasting packets that comprises determining one of the plurality of VRs for a packet received from a service provider for multicasting, and switching a routing context of the VRE to a routing context associated with the VR determined for received packet. At least a portion of the packet is read from one of a plurality of multicast address spaces associated with the selected VR to multicast the packet. The packet may be a first packet received from a service provider for multicasting to a first multicast destination, and when a second packet is received from the service provider for multicasting, the method may also include determining another one of the VRs for the second packet, and switching the routing context of the VRE to a routing context associated with the VR determined for the second packet. At least a portion of the second packet is read from another of the plurality of multicast address spaces associated with the VR determined for the second packet to multicast the second packet. The second packet may be forwarded to second multicast destinations.

BRIEF DESCRIPTION OF THE DRAWINGS

The appended claims are directed to some of the various embodiments of the present invention. However, the detailed description presents a more complete understanding of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

In various embodiments, the present invention provides an improved virtual routing system and method for packet multicasting. The present invention, in various embodiments, also provides an improved packet multicasting system and method. The present invention, in various embodiments, also provides virtual routing system and method that takes advantage of multiple routing contexts allowing a service provider to support multicast features for many different access clients with a single piece of hardware.

Figure 1:
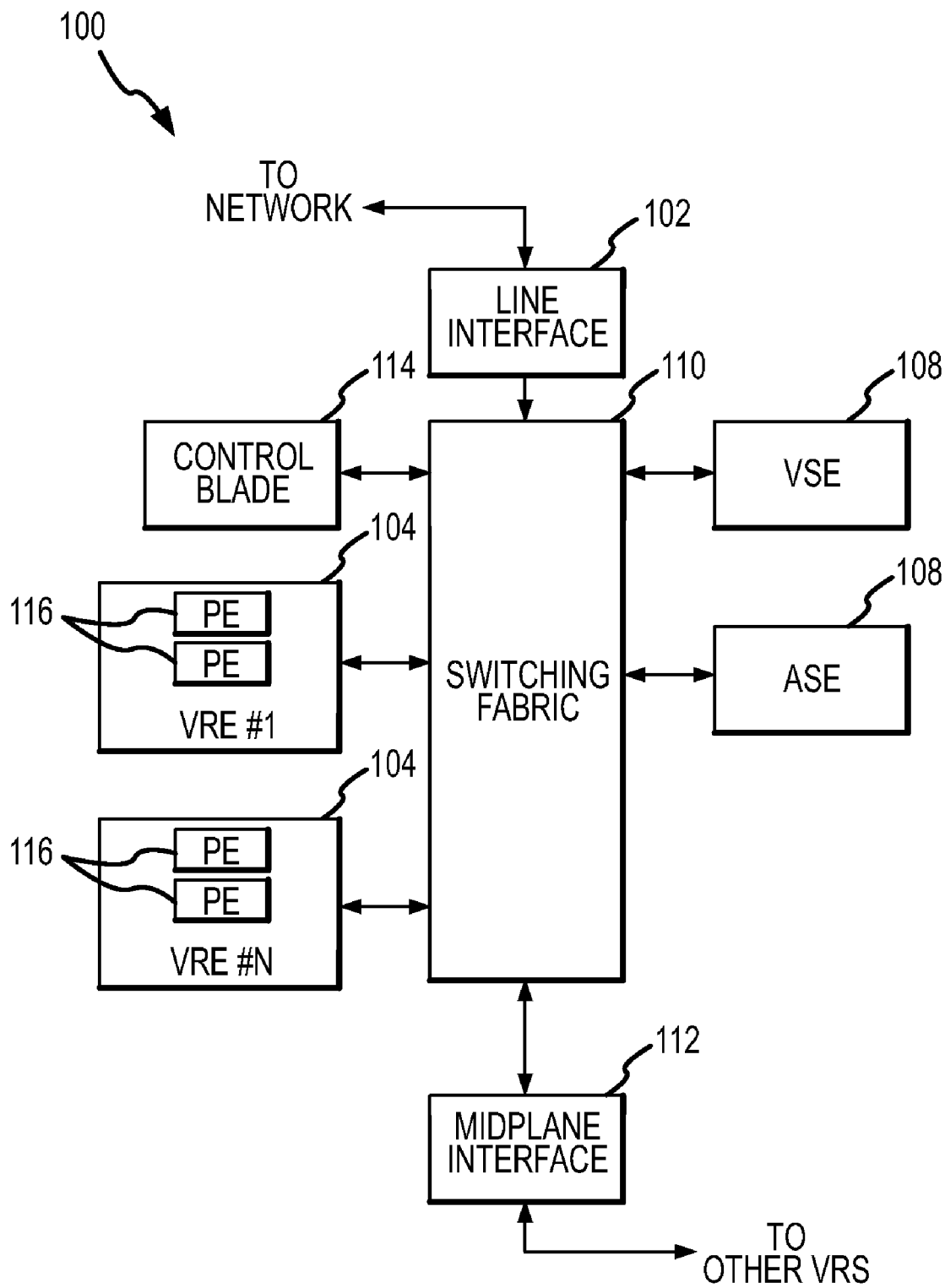
FIG. 1 is a simplified functional block diagram of a virtual routing system in accordance with an embodiment of the present invention.

FIG. 1 is a simplified functional block diagram of a virtual routing system in accordance with an embodiment of the present invention. Virtual routing system 100, among other things, may provide hardware-based network processor capabilities and high-end computing techniques, such as parallel processing and pipelining. In embodiment of the present invention, virtual routing system 100 may implement one or more virtual private networks (VPNs) and one or more associated virtual routers (VRs), and in some embodiments, system 100 may implement hundreds and even thousands of VPNs and VRs. Virtual routing system 100 may include one or more line interfaces 102, one or more virtual routing engines (VREs) 104, one or more virtual service engines (VSEs) 106, and one or more advanced security engines (ASEs) 108 coupled by switching fabric 110. Virtual routing system 100 may also include interface 112 which may interface with other routing systems. Virtual routing system 100 may also include one or more control blades 114 to create VPNs and/or VRs to operate on VREs 104.

In one embodiment, several VPNs and/or VRs may, for example, run on one of processing engines (PEs) 116 of VRE 104. A VPN or VR may be a software context comprised of a set of objects that are resident in the processing engine's memory system. The software context may include the state and processes found in a conventional router, however hundreds or more of these virtual router contexts may be overlaid onto a single processing engine and associated memory system. Accordingly, one of processing engines 116 may provide the context of many VRs to be shared allowing one piece of hardware, such as virtual routing system 100, to function as up to a hundred or even a thousand or more routers.

Line interface 102 may receive packets of different packet flows from an external network over a communication channel. VREs 104 may perform packet classification, deep packet inspection, and service customization. In one embodiment, VRE 104 may support up to one million or more access control list (ACL) level packet flows. VREs 104 may include a virtual routing processor (not illustrated) to provide hardware assisted IP packet forwarding, multi-protocol label switching (MPLS), network address translation (NAT), differentiated services (DiffServ), statistics gathering, metering and marking. VREs 104 and VSEs 106 may include a virtual service controller (not illustrated) to support parallel processing and pipelining for deep packet inspection and third-party application computing. VSEs 106 may perform parallel processing and/or pipelining, and other high-end computing techniques, which may be used for third party applications such as firewall services and anti-virus services. ASEs 108 may provide for hardware and hardware assisted acceleration of security processing, including encryption/decryption acceleration for IP security protocol type (IPSec) packet flows and virtual private networks (VPNs). Switching fabric 110 may be a high-capability non-blocking switching fabric supporting rates of up to 51.2 Gbps and greater.

Line interface 102 may include a flow manager (not illustrated) to load-balance service requests to VSEs 106 and VREs 104, and may support robust priority and/or weighted round robin queuing. In one embodiment, the flow manager may provide for service load balancing and may dynamically determine one of VREs 104, which may best handle a certain packet flow. Accordingly, all packets of a particular flow may be sent to the same VRE 104. Line interface 102 may identify one of the VREs to process packets of a packet flow based on a physical interface and virtual channel from which the packets of the packet flow were received. The identified VRE may perform ingress metering, header transformation and egress metering for packets of the packet flow. In one embodiment, hardware based metering and marking using a dual token bucket scheme assists in rate-control capabilities of system 100. This may allow for granular application level support and the ability to provide strong performance based service level agreements (SLAs).

Different packets may take different paths through virtual routing system 100 and may not necessarily require the resources of all the various functional elements of virtual routing system 100. In one embodiment, a packet, such as a virtual local area network (VLAN) Ethernet packet, may arrive at an input port of line interface 102. The input port may be a gigabit Ethernet input port, which may be one of several input ports. The flow manager may program a steering table look-up to determine which VLAN is associated with a particular one of VREs 104. The flow manager may tag the packet with an internal control header and may transfer the packet from line interface 102 across switching fabric 110 to the selected VRE 104. A service controller of VRE 104 may perform deep packet classification and extract various fields on the packet header. A flow cache may be looked up to determine whether the packet should be processed in hardware or software. If the packet is to be processed in hardware, an index to the packet processing action cache may be obtained.

The packet may be deposited via a high-speed direct access memory (DMA) into the VRE's main memory. A routing processor may retrieve the packet, identify the packet processing actions and may perform actions, such as time-to-live decrementation, IP header and checksum updating, and IP forwarding patch matching. Egress statistics counters may also be updated. The packet may be forwarded to one of ASEs 108 for security operations. The packet may also be forwarded to another one of VREs 104.

Although system 100 is illustrated as having several separate functional elements, one or more of the functional elements may be combined and may be implemented by combinations of software configured elements, such as processors including digital signal processors (DSPs), and/or other hardware elements.

In accordance with embodiments of the present invention, virtual routing system 100 supports a plurality of virtual routers (VRs) instantiated by one of virtual routing engines (VRE) 104 and which may operate on PE's 116. In this embodiment, the instantiation of each VR includes an associated routing context. The virtual routing system may perform a method of multicasting packets that comprises determining one of the plurality of VRs for a packet received from a service provider for multicasting, and switching a routing context of the VRE to a routing context associated with the VR determined for received packet. At least a portion of the packet is read from one of a plurality of multicast address spaces associated with the selected VR to multicast the packet. The packet may be a first packet received from a service provider for multicasting to a first multicast destination, and when a second packet is received from the service provider for multicasting, the method may also include determining another one of the VRs for the second packet, and switching the routing context of the VRE to a routing context associated with the VR determined for the second packet. At least a portion of the second packet is read from another of the plurality of multicast address spaces associated with the VR determined for the second packet to multicast the second packet. The second packet may be forwarded to second multicast destinations.

Accordingly, multiple VRs may utilize multiple multicast address spaces, which may allow a service provider, such as an Internet Service Provider (ISP), to utilize system 100 simultaneously for multicasting for many different access clients (i.e., subscribers). Conventional routing systems may require a separate router for each customer or service provider.

Figure 2:
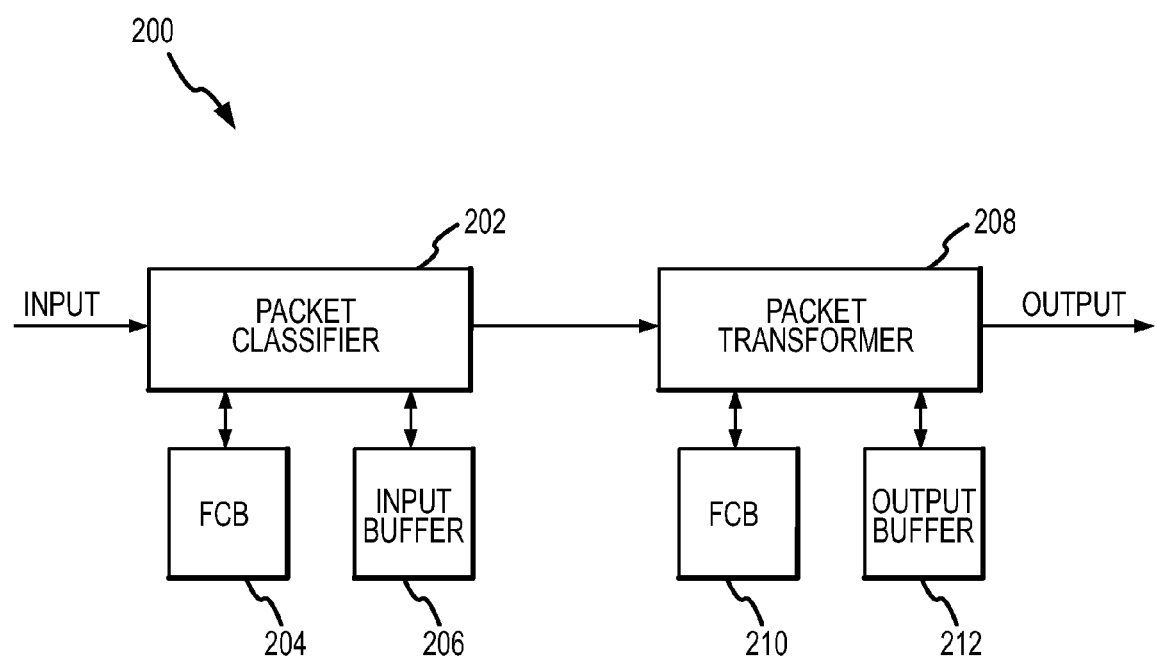
FIG. 2 is a functional block diagram of a packet multicasting system in accordance with an embodiment of the present invention.

FIG. 2 is a functional block diagram of a packet multicasting system in accordance with an embodiment of the present invention. Packet multicasting system 200 may be implemented by a virtual routing engine, such as one of VREs 104 (FIG. 1). System 200 may include packet-classifying system 202, which receives packets from a network and may classify a packet for multicasting in a certain routing context using flow classification block 204. Packet classifying system 202 may also buffer the received packets in input buffer 206. System 200 may also include packet-transforming system 208 which may receive the multicast packet and a first of a plurality of flow classification indices from packet classifying system 202 and may buffer the multicast packet in output buffer 212, which may be associated with the packet transformer. Packet transforming system 208 may identify first transform control instructions from the first flow classification index, and may transform the multicast packet in accordance with the first transform control instructions.

For next instances of multicasting the packet, packet classifying system 202 may send a next of the flow classification indices to packet transforming system 208 without the multicast packet, and packet transforming system 208 may identify next transform control instructions from the next of the flow classification indices. Packet transforming system 208 may also read the multicast packet from buffer 212, and transform the multicast packet in accordance with the next transform control instructions.

In one embodiment, the flow classification index may identify the packet as a multicast packet and accordingly, the packet can re-read from buffer 212 rather than be re-sent from packet classifier 208 for each instance of multicasting. This is described in more detail below. Although system 200 is illustrated as having several separate functional elements, one or more of the functional elements may be combined and may be implemented by combinations of software configured elements, such as processors including digital signal processors (DSPs), and/or other hardware elements. In embodiments of the present invention, at least a payload portion of a packet (e.g., a packet without all or portions of the header) may be buffered in input buffer 206, may be transferred to packet transforming system 208 and may be buffered in output buffer 212. In these embodiments, packet classifying system 202 may remove all or portions of the header during packet classification, and packet transforming system 208 may add all or portions of a new header during packet transformation.

Figure 3:
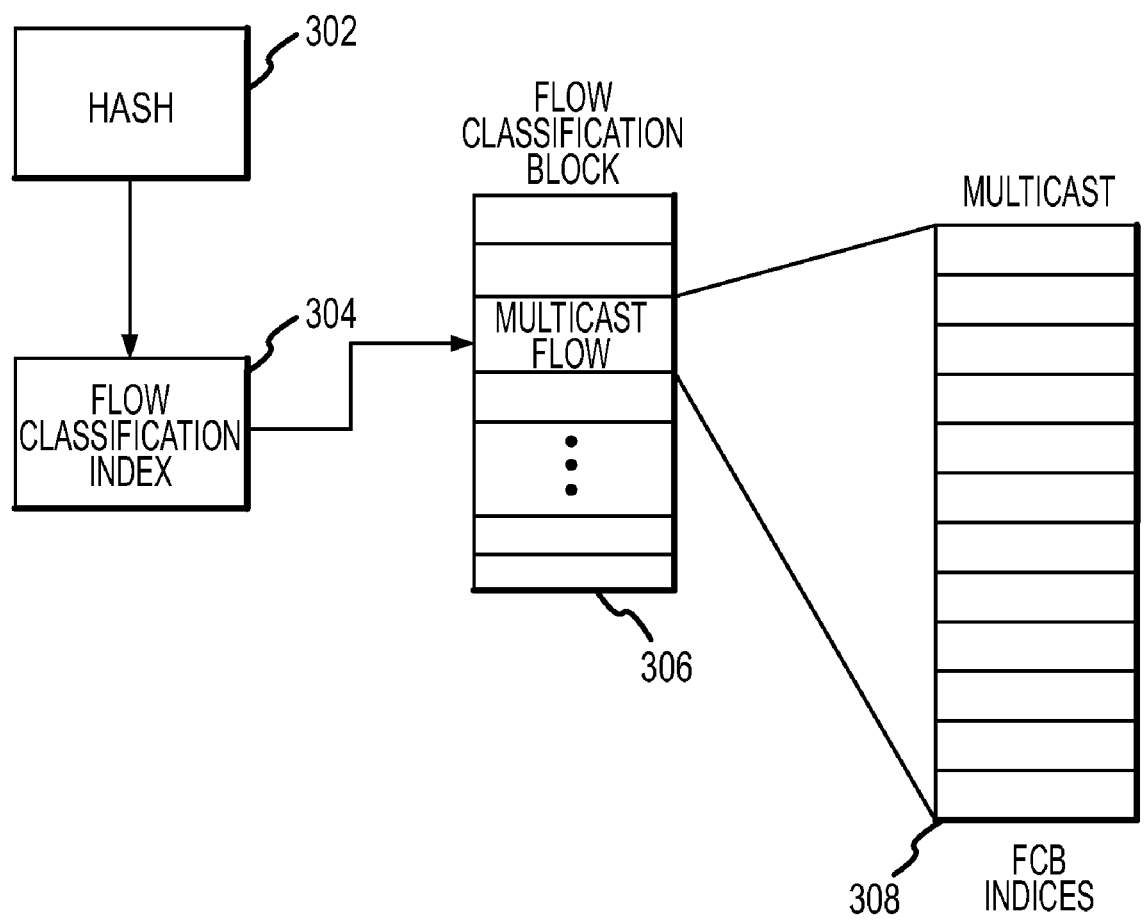
FIG. 3 illustrates the identification of flow classification indices for multicast packets in accordance with an embodiment of the present invention.

FIG. 3 illustrates the identification of flow classification indices for multicast packets in accordance with an embodiment of the present invention. When a packet is received at a routing system, such as system 200 (FIG. 2), hash 302 may be performed on a header portion of the packet to generate flow classification index 304 which may be used to locate a particular flow index of flow classification block (FCB) 304. FCB 304 may correspond with FCB 202 (FIG. 2). In the case of a multicast packet flow, the particular flow index of FCB 304 may point to array 308 of flow indices. Each flow index of array 308 may correspond with an instance of multicasting. In accordance with an embodiment of the present invention, one of the flow indices of array 308 may be provided to a packet transformer, such as packet transforming system 208, for use in transforming a buffered packet for multicasting. This is described in more detail below.

Figure 4:
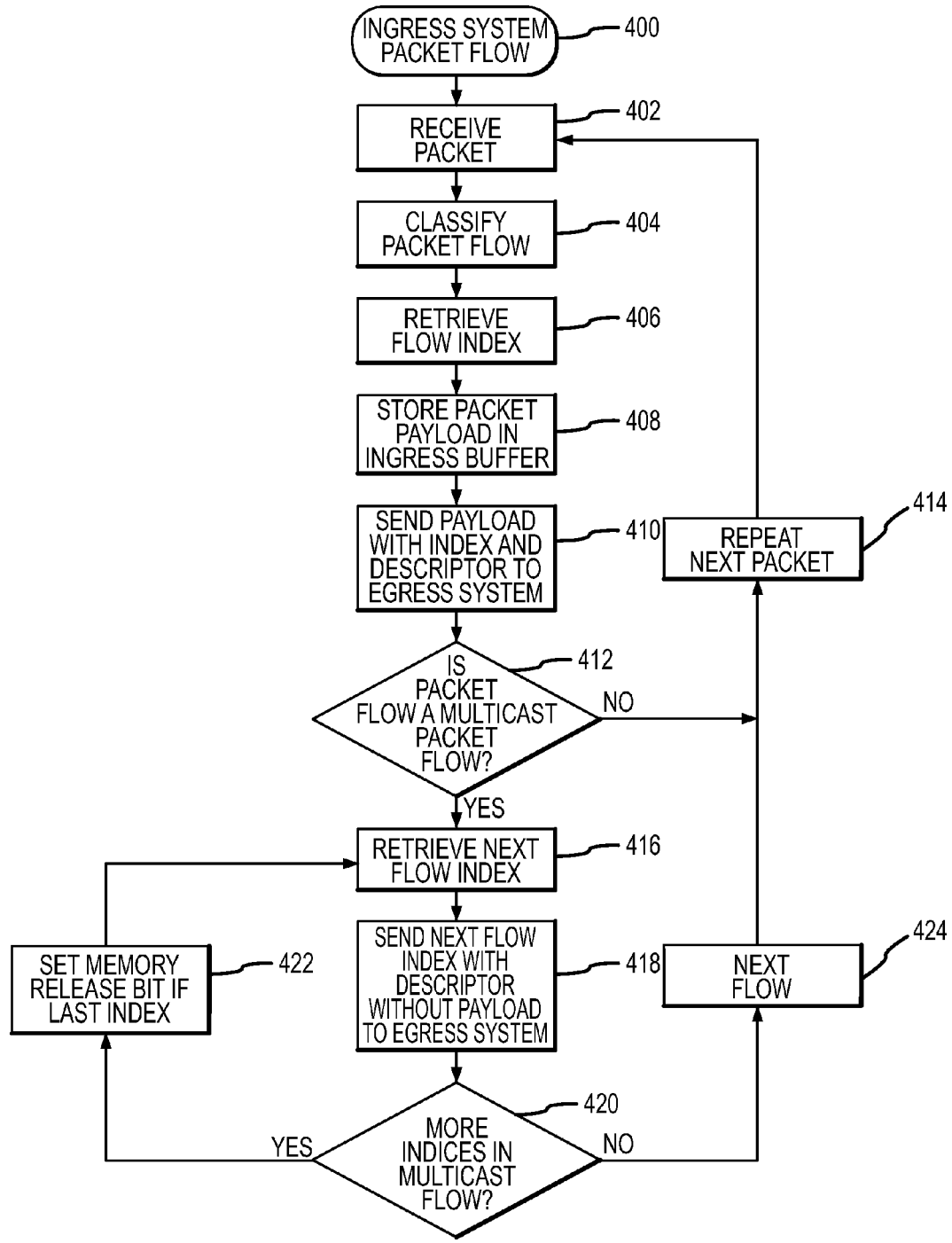
FIG. 4 is a flow chart of an ingress system packet flow procedure in accordance with an embodiment of the present invention.

FIG. 4 is a flow chart of an ingress system packet flow procedure in accordance with an embodiment of the present invention. Procedure 400 may be implemented by an ingress system, such as packet classifying system 202 (FIG. 2) although other systems may also be suitable. In operation 402, a packet is received and in operation 404, the packet flow may be classified. Operation 404 may classify the packet flow by performing a hash on header portions of the packet as illustrated in FIG. 3. In operation 406, a flow index is retrieved based on the packet flow classification of operation 404. In the case of a non-multicast packet flow (e.g., a unicast packet flow), one flow index may be identified and retrieved. In the case of a multicast packet flow, a plurality of flow indices may be identified, such as array 308 (FIG. 3). In operation 408, the received packet may be buffered in an input memory, such as input buffer 206 (FIG. 2). In operation 410, the packet along with the flow index may be sent to an egress system, such as packet transforming system 208 (FIG. 2). In the case of a multicast packet, operation 410 may send the packet along with a first flow index of the plurality of flow indices. A descriptor may be included to identify the flow as a multicast flow and instruct the egress system to re-read the same packet for subsequently received flow indices.

Operation 412 determines if the classified packet flow is a multicast packet flow or a unicast packet flow. When the packet flow is a unicast packet flow, operation 414 may repeat the performance of operations 402 through 412 for a subsequent packet. When the packet flow is a multicast packet flow, operation 416 is performed. In operation 416, the next flow index of the plurality of indices is retrieved and in operation 418, it is sent to the egress system. In one embodiment, a descriptor included with the next flow index indicates that the flow is a multicast flow instructing the egress system to use a previous packet. Operation 420 determines when there are more flow indices and operations 416 and 418 may be performed for each of the remaining indices. Operation 422 may set a memory release bit to allow the egress system to release the memory location where it has stored the multicast packet after receipt of the last flow index. In one embodiment, the memory release bit may be part of a descriptor, and in another embodiment, it may be a particular bit of the flow index sent in operation 418.

When there are no more flow indices of the plurality to be sent, each instance of packet multicasting has been provided to the egress system, and operation 424 may be performed for a next packet flow re-performing procedure 400. Although the individual operations of procedure 400 are illustrated and described as separate operations, one or more of the individual operations may be performed concurrently and nothing requires that the operations be performed in the order illustrated.

Figure 5:
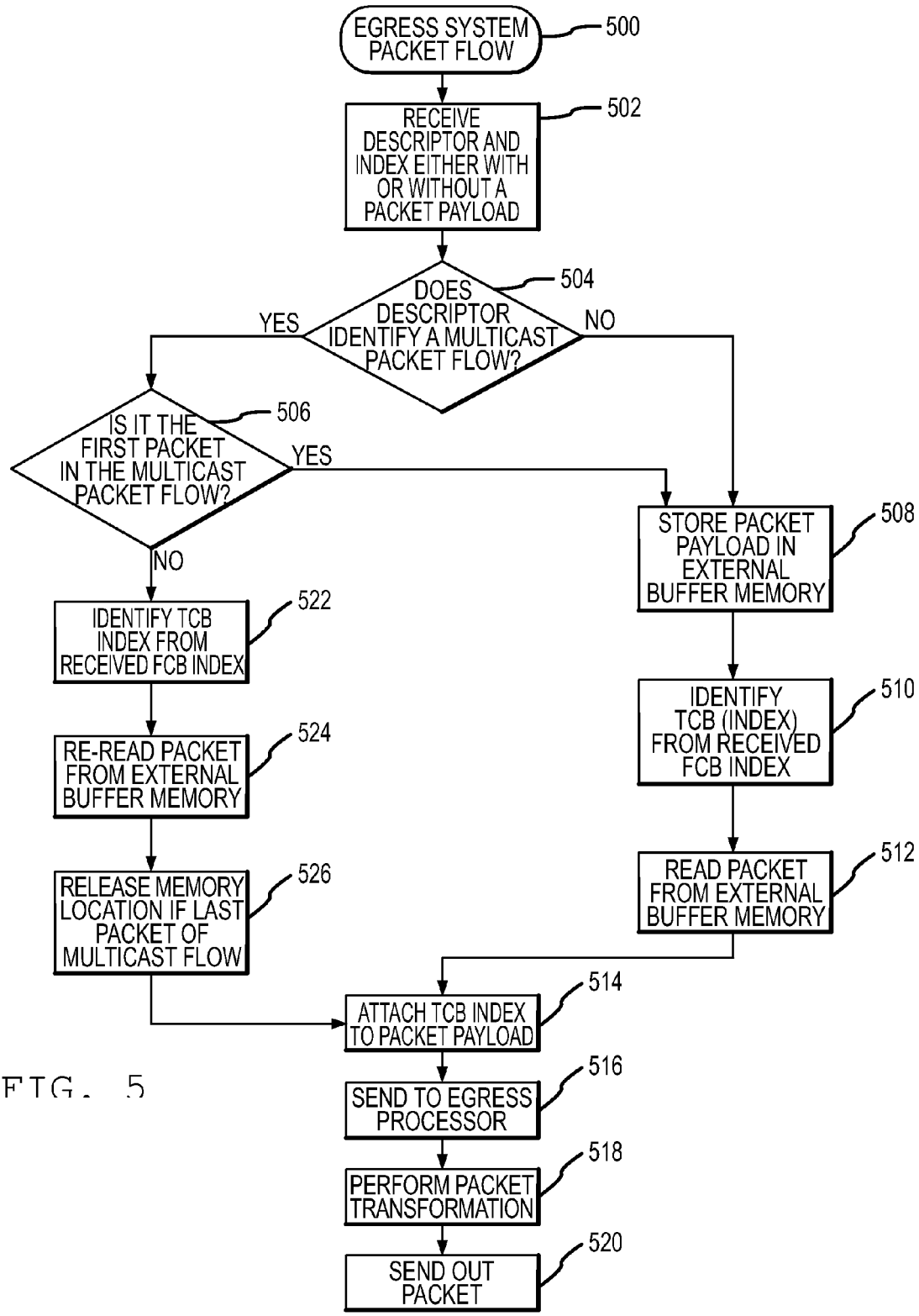
FIG. 5 is a flow chart of an egress system packet flow procedure in accordance with an embodiment of the present invention.

FIG. 5 is a flow chart of an egress system packet flow procedure in accordance with an embodiment of the present invention. Procedure 500 may be performed by an egress system such as packet transforming system 208 (FIG. 2) although other systems may also be suitable for performing procedure 500. In operation 502, a flow index may be received from an ingress system. The flow index may be received with a packet (e.g., at least the payload) or may be received without a packet. Flow indices received with a packet may be for packets having a unicast packet flow or may be a packet of a first instance of multicast packet flow.

Flow indices received in operation 502 without a packet may be for subsequent instances of a multicast packet flow. In one embodiment, a descriptor may be received in operation 502 to indicate whether the flow is a multicast flow.

Operation 504 determines when the flow index is for a multicast packet flow. When operation 504 determines when the flow index is for a multicast packet flow, operation 506 is performed. Operation 506 determines whether the flow index is for a first instance of a multicast flow. When operation 506 determines that the flow index is for a first index of a multicast flow, or when operation 504 determines that the flow index is not for a multicast flow, operation 508 is performed. In operation 508, the received packet is buffered in memory, such as buffer 212. In operation 510, a transform index may be identified for the packet from the received flow index. In operation 512, the buffered packet may be read from the buffer, the transform index may be attached to the packet in operation 514. In operation 516, the transform index and packet are sent to a packet transform processor, such as an egress processor. In operation 518, the transform processor may perform a packet transform on the packet by using the transform index. In one embodiment, the transform index may identify a transform control block (TCB), such as TCB 210 (FIG. 2), which may be identified by the transform processor for performing packet transformation in operation 518. In operation 520, the transformed packet may be sent out for routing to a network.

In the case of a multicast packet flow wherein the packet is not received in operation 502, operations 522-526 are performed. Similar to operation 510, operation 522 identifies a transform index from the received flow index. In operation 522, similar to operation 512, the buffered packet is read from the buffer. In operation 526, the memory location where the multicast packet is stored may be released in the case of the last instance of the multicast flow. In one embodiment, a descriptor may be used to identify when to release the memory location. The descriptor may be part of the flow index received in operation 502.

Accordingly, for a multicast flow, a packet may be received only once (i.e., the first time) and stored only once (e.g., operation 508) and for subsequent instances of multicasting, the packet is re-read from a buffer. Although the individual operations of procedure 500 are illustrated and described as separate operations, one or more of the individual operations may be performed concurrently and nothing requires that the operations be performed in the order illustrated.

Figure 6:
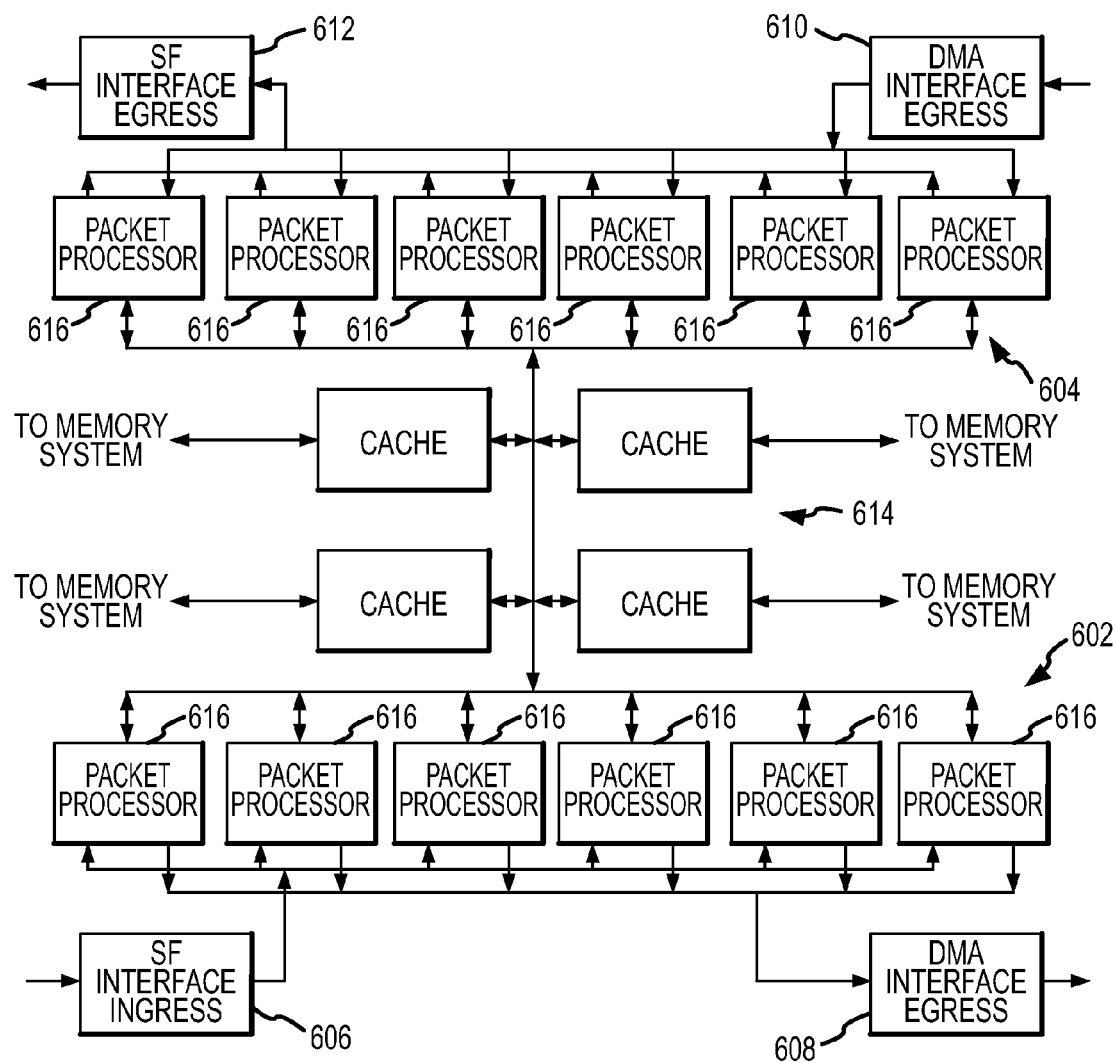
FIG. 6 is a functional block diagram of a packet-forwarding engine in accordance with an embodiment of the present invention.

FIG. 6 is a functional block diagram of a packet-forwarding engine in accordance with an embodiment of the present invention. Packet-forwarding engine (PFE) 600 may be suitable for use as system 200, although other systems may also be suitable. PFE 600 may provide hardware-assisted packet forwarding, and in one embodiment, PFE 600 may implement VR/VI-based forwarding of L3/L4 packet types including MPLS, IP, TCP/IP, UDP/IP and IPSec packet types. In some embodiments, PFE 600 may also implement flow cache and IP/MPLS route look-up forwarding modes, header insertion/replacement, MPLS header processing, including label push/pop and TTL decrement. In some embodiments, PFE 600 may also implement IP header processing including header validation, TTL decrement, DiffServ code-point marking, and header checksum adjustment. In some embodiments, PFE 600 may also implement TCP/IP Network Address Translation (NAT), ingress and egress rate limiting and ingress and egress statistics.

PFE 600 may operate in one of PE's 116 (FIG. 1) and may be logically situated between a switch fabric interface and a DMA engine of one of PEs 116 (FIG. 1). PFE 600 may be partitioned into ingress system 602 and egress system 604 as illustrated. Ingress system 602 may be suitable for use as packet classifier 202 (FIG. 2) and egress system 604 may be suitable for use as packet transformer 208 (FIG. 2). Ingress system 602 may process incoming packets received from the switch fabric ingress interface 606 and may transfer them to the DMA engine ingress 608. Egress system 604 may process outgoing packets from the DMA engine egress 610 and may transfer them to switch fabric egress interface 612. Both the ingress and egress systems may have direct access to a processing engines memory system.

In one embodiment, the micro-architecture of both PFE 600 ingress and egress units may include an array of packet processors 616 that may share an on-chip write-back cache 614. Each packet processor may operate on a different packet and hardware interlocks may maintain packet order. The ingress packet processors may share common micro-code for ingress processing and the egress packet processors may share common micro-code for egress processing. Memory of PFE 600 may map the ingress and egress instruction stores and supports micro-code updates through write transactions.

Ingress system 602 may pass forwarding state to the DMA engine, which may incorporate this state into the packet, receive descriptor. This forwarding state indicates whether the CPU should software forward the packet or the packet may bypass the CPU and PFE 600 can hardware forward the packet. The forwarding state also may include an index into a forwarding transform cache that describes PFE processing per packet micro-flow. For software forwarded packets, the receive descriptor may be pushed onto the DMA ingress descriptor queue. For hardware forwarded packets, including multicast packets, the descriptor may bypass the DMA ingress queue and be pushed directly onto the DMA egress descriptor queue as a transmit descriptor.

In an embodiment of the present invention, ingress system 602 may provide at least two basic forms of packet classification. One is flow-based, using various fields of the LQ header along with fields in the L3/L4 headers to identify a particular micro-flow in the context of a particular VR. The other form uses the upper bits of the IP address or MPLS label to index a table of flow indices. The host software controls which classification form PFE 600 uses by programming different micro-code into the ingress instruction store. In both forms, the classification result may be a forwarding index that the hardware uses to select the correct packet transformations.

In an embodiment of the present invention, each flow ID cache entry stores the LQ ID, LQ protocol, L3, and L4 fields that identify a particular VR micro-flow along with state indicating whether to hardware or software forward packets belonging to the micro-flow. Ingress system 602 generates an index (e.g., flow classification index 304 (FIG. 3)) into the flow ID cache (e.g., FCB 306 (FIG. 3)) by hashing the incoming packet's LQ ID, LQ protocol, L3, and L4 header fields. It then looks-up the indexed cache entry and compares the packet micro-flow ID fields to the cached micro-flow ID fields. On a cache hit, the FwdAction field of the cache entry indicates whether to software or hardware forward the packet. On a cache miss, the ingress controller allocates a cache entry and forwards the packet to software for flow learning.

In an embodiment of the present invention, when programmed for table lookup mode, PFE 600 classifies an IP packet by performing an IP destination address route look-up from the IP Prefix Table. In one embodiment, the IP Prefix Table may include a 16M entry first level IP prefix table indexed by the upper 24-bits of the IP destination address and some number of 256-entry IP prefix sub-tables indexed by the lower 8-bits of IP destination address. A prefix table entry may include either a transform cache index or a pointer to a prefix sub-table. The state of the table entry's Next Table field determines the format of the table entry. When the NextTable bit is set to '1', the bottom 31 bits of the entry indicate the address to the next-level table. When the NextTable bit is set to '0', the bottom bits of the entry indicate the forwarding index, and whether or not to send packets to software. The host software can steer packets with particular IP prefixes to the CPU by setting the Software Only field in the table leaf entries.

In an embodiment of the present invention, when programmed for table lookup mode and the protocol field of the ingress switch fabric header contains MPLS bit set, PFE 600 classifies a packet by performing a table lookup based on the packet's 20-bit MPLS label. In this embodiment, there may be two tables—one for when the MPLS BOS bit isn't set and one for when the MPLS BOS bit is set. Each of the table's 1M entries contains the 20-bit forwarding index, and a bit to direct packets to the CPU.

In an embodiment of the present invention, PFE 600 maintains a table of transform control blocks (TCBs), which direct how the egress controller may process outgoing-packets. The egress controller uses a forwarding index, carried by the DMA descriptor, to select a transform control block from the table before processing packets. To update a TCB, host software may send a control packet containing a message with an address parameter that points to the new TCB. Software may issue the TCB update control packet before issuing the packet being forwarded. This may ensure that the forwarded packet is processed according to the updated TCB.

In an embodiment of the present invention, some fields may be used to maintain packet order and associate the TCB with a specific flow. In flow mode where several new packets for a flow could be sent to the CPU there is a danger that once the CPU updates the TCB and FCB a packet could be hardware forwarded while the CPU still has packets for that flow. Packet order may be enforced by the TCB. When the TCB is written the DropCpuPkt bit should be zero, this may allow the CPU to send the NEW packets it has for that flow. However when the first FWD_HW packet is seen with this bit clear, the forward engine may update the TCB and set this bit. Subsequent packets from the CPU (recognized because they are marked FWD_HW_COH) may be dropped. There may also be a consistency check performed between the FCB and the TCB. On ingress the SF header SrcChan is replaced with the PendingTag field of the FCB, on egress the SrcChan is compared against the FCBTag field of the TCB. If the tags mismatch the packet is dropped. For prefix mode the SrcChan is replaced with zero, and the FCBTag field may be initialized to zero.

In an embodiment of the present invention, packet header transformation involves the replacement of some number of header bytes of an ingress packet with some number of bytes of replacement header data. Under the control of a TCB, egress system 604 may selectively replace and recompute specific fields in a small set of protocol headers. Egress system 604 begins the header transform by stripping the incoming packet's SF header along with the number of bytes indicated by the SF header offset field. At that point, the controller may begin copying bytes from the buffer pointed to by the TCB's HDRPTR field into the egress packet buffer. PFE 600 may copy the number of new header bytes defined by the TCB's HDRLEN field. After performing this header replacement, PFE 600 then goes through the TCB enable bits to determine what other header transformations need to be made.

Egress system 604 may perform a network address translation (NAT) for IP addresses and for TCP/UDP port addresses. When software enables IP or TCP/UDP NAT, it may also provide the associated replacement addresses and checksum adjustments in the corresponding TCB fields. When the hardware detects one of the NAT enable bits may be set to '1', it may replace both the source and destination addresses. If software intends to translate only the source address, it may still supply the correct destination address in the TCB replacement field. Similarly, the software may also supply the correct source address in the TCB replacement field when it is just replacing the destination address. A checksum adjustment may also be computed.

On the ingress side, layer two packets may be distinguished by bit five of the SF header protocol field being set. Micro-code checks this bit and jumps to separate L2 header loading logic when it is set. Separate code-points for each L2/L3 protocol are defined in the SF spec, jumping to the proper parsing logic is done by using the entire SF protocol (including the L2 bit) field as an index into a jump table and jumping to that instruction which causes a jump to the proper code segment. One of the functions of the L2 parsing logic is to determine the size of the variable length L2 headers and increment the SF offset field by that amount (in some cases, such as de-tunneling $2^{nd}$ pass) so that egress system 604 may strip off that part of the header. In addition the SF protocol field may be changed (also $2^{nd}$ pass de-tunneling) to another protocol type depending what the underlying packet type is, this may also be determined by the parsing logic and causes the proper egress code path to be taken.

Thus, an improved packet routing system and method have been described. Also described are an improved packet multicasting system and method, and a method and system that more efficiently generate multicast packets.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. An article comprising a computer-readable storage medium having stored thereon computer-readable instructions for packet multicasting, that when executed by a computing platform, result in:
   identifying a plurality of flow classification indices for a multicast packet;
   sending the multicast packet and a first of the flow classification indices to a packet transformer;
   buffering the multicast packet in a memory associated with the packet transformer;
   identifying first transform control instructions from the first flow classification index;
   transforming the multicast packet in accordance with the first transform control instructions;

sending a next of the flow classification indices without the multicast packet to the packet transformer;

identifying next transform control instructions from the next of the flow classification indices; reading the multicast packet from the memory; and transforming the multicast packet in accordance with the next transform control instructions.

2. The article of claim 1 wherein the computer-readable instructions further result in repeating, for each of the flow classification indices of the plurality, the sending the next flow classification index, the identifying the next transform control instructions, the reading and the transforming the multicast packet, to generate multicast packets for transmission, and wherein prior to transforming, the multicast packet is provided with each next flow classification index of the plurality to an egress processor, and wherein transforming further results in transforming the multicast packet by the egress processor in accordance with each next flow classification index.

3. A method for packet multicasting comprising:

identifying a plurality of flow classification indices for a multicast packet;

sending the multicast packet and a first of the flow classification indices to a packet transformer;

buffering the multicast packet in a memory associated with the packet transformer;

identifying first transform control instructions from the first flow classification index;

transforming the multicast packet in accordance with the first transform control instructions;

sending a next of the flow classification indices without the multicast packet to the packet transformer;

identifying next transform control instructions from the next of the flow classification indices;

reading the multicast packet from the memory; and transforming the multicast packet in accordance with the next transform control instructions.

4. The method of claim 3 further comprising repeating, for each of the flow classification indices of the plurality, the sending the next flow classification index, the identifying the next transform control instructions, the reading and the transforming the multicast packet, to generate multicast packets for transmission.

5. The method of claim 4 wherein prior to transforming, the method further comprises providing the multicast packet with each next flow classification index of the plurality to an egress processor, and wherein transforming further comprises transforming the multicast packet by the egress processor in accordance with each next flow classification index.

6. The method of claim 5 wherein a packet classifier performs identifying the plurality of flow classification indices, sending the multicast packet and the first flow classification index, and sending each next flow classification index without the multicast packet, and wherein the packet transformer performs the buffering, the identifying the transform control instructions and providing the multicast packet with each next flow classification index of the plurality to the egress processor.

7. The method of claim 6 wherein the packet classifier is comprised of a first multiprocessor system and the packet transformer is comprised of a second multiprocessor system which includes the egress processor.

8. The method of claim 3 further comprising:

performing a hash on header portions of a received packet to determine a flow classification block index; and looking up the flow classification block index in a flow classification block (FCB) to determine a flow classification index for a unicast packet and a location of the plurality of flow classification indices for the multicast packet.

9. The method of claim 3 wherein transforming includes replacing at least portions of a header of multicast packet with new portions, the new portions being in accordance with the transform control instructions.

10. The method of claim 3 wherein a single flow classification index is identified for a unicast packet and the method includes:

sending the unicast packet and a single flow classification index to the packet transformer, buffering the unicast packet in the memory associated with the packet transformer;

identifying transform control instructions for the unicast packet from the single flow classification index; and transforming the unicast packet in accordance with the identified transform control instructions.

11. The method of claim 10 wherein when an incoming packet is identified as a unicast packet, the method further includes refraining from performing for the unicast packet:

sending the next of the flow classification indices without a packet to the packet transformer;

identifying next transform control instructions from the next of the flow classification indices; and reading a packet from the memory; and transforming the packet in accordance with the next transform control instructions.

12. A method for packet multicasting comprising:

identifying a plurality of flow classification indices for a multicast packet;

sending the multicast packet and a first of the flow classification indices to a packet transformer;

buffering the multicast packet in a memory associated with the packet transformer;

identifying first transform control instructions from the first flow classification index;

transforming the multicast packet in accordance with the first transform control instructions; and wherein the flow classification index corresponds with a packet flow for a packet, and when the packet flow is a multicast packet, retrieving an additional flow classification index for each instance of multicasting, and sending each additional of the flow classification indices without the multicast packet to the packet transformer, wherein the flow classification indices include a descriptor to identify the flow as a multicast flow.

13. The method of claim 12 further comprising repeating, for each of the flow classification indices of the plurality, the sending the next flow classification index, the identifying the next transform control instructions, the reading and the transforming the multicast packet, to generate multicast packets for transmission.

14. The method of claim 13 wherein prior to transforming, the method further comprises providing the multicast packet with each next flow classification index of the plurality to an egress processor, and wherein transforming further comprises transforming the multicast packet by the egress processor in accordance with each next flow classification index.

15. The method of claim 14 wherein a packet classifier performs identifying the plurality of flow classification indices, sending the multicast packet and the first flow classification index, and sending each next flow classification index without the multicast packet, and wherein the packet transformer performs the buffering, the identifying the transform control instructions and providing the multicast packet with each next flow classification index of the plurality to the egress processor.

16. The method of claim 15 wherein the packet classifier is comprised of a first multiprocessor system and the packet transformer is comprised of a second multiprocessor system which includes the egress processor.

17. The method of claim 12 further comprising:
performing a hash on header portions of a received packet to determine a flow classification block index; and
looking up the flow classification block index in a flow classification block (FCB) to determine a flow classification index for a unicast packet and a location of the plurality of flow classification indices for the multicast packet.

18. The method of claim 12 wherein transforming includes replacing at least portions of a header of multicast packet with new portions, the new portions being in accordance with the transform control instructions.

19. The method of claim 12 wherein a single flow classification index is identified for a unicast packet and the method includes:
sending the unicast packet and a single flow classification index to the packet transformer;
buffering the unicast packet in the memory associated with the packet transformer;
identifying transform control instructions for the unicast packet from the single flow classification index; and
transforming the unicast packet in accordance with the identified transform control instructions.

20. The method of claim 19 wherein when an incoming packet is identified as a unicast packet, the method further includes refraining from performing for the unicast packet:
sending the next of the flow classification indices without a packet to the packet transformer;
identifying next transform control instructions from the next of the flow classification indices; and
reading a packet from the memory; and transforming the packet in accordance with the next transform control instructions.

21. A method for packet multicasting comprising:
identifying a plurality of flow classification indices for a multicast packet;
sending the multicast packet and a first of the flow classification indices to a packet transformer;
buffering the multicast packet in a memory associated with the packet transformer;
identifying first transform control instructions from the first flow classification index;
transforming the multicast packet in accordance with the first transform control instructions;
performing a hash on header portions of a received packet to determine a flow classification block index; and
looking up the flow classification block index in a flow classification block (FCB) to determine a flow classification index for a unicast packet and a location of the plurality of flow classification indices for the multicast packet.

22. The method of claim 21 further comprising:
sending a next of the flow classification indices without the multicast packet to the packet transformer;
identifying next transform control instructions from the next of the flow classification indices;
reading the multicast packet from the memory; and
transforming the multicast packet in accordance with the next transform control instructions.

23. The method of claim 22 further comprising repeating, for each of the flow classification indices of the plurality, the sending the next flow classification index, the identifying the next transform control instructions, the reading and the transforming the multicast packet, to generate multicast packets for transmission.

24. The method of claim 23 wherein prior to transforming, the method further comprises providing the multicast packet with each next flow classification index of the plurality to an egress processor, and wherein transforming further comprises transforming the multicast packet by the egress processor in accordance with each next flow classification index.

25. The method of claim 24 wherein a packet classifier performs identifying the plurality of flow classification indices, sending the multicast packet and the first flow classification index, and sending each next flow classification index without the multicast packet, and wherein the packet transformer performs the buffering, the identifying the transform control instructions and providing the multicast packet with each next flow classification index of the plurality to the egress processor.

26. The method of claim 25 wherein the packet classifier is comprised of a first multiprocessor system and the packet transformer is comprised of a second multiprocessor system which includes the egress processor.

27. The method of claim 21 wherein the flow classification index corresponds with a packet flow for a packet, and when the packet flow is a multicast packet, the method further comprises retrieving an additional flow classification index for each instance of multicasting, and sending each additional of the flow classification indices without the multicast packet to the packet transformer, wherein the flow classification indices include a descriptor to identify the flow as a multicast flow.

28. The method of claim 21 wherein transforming includes replacing at least portions of a header of multicast packet with new portions, the new portions being in accordance with the transform control instructions.

29. The method of claim 21 wherein a single flow classification index is identified for a unicast packet and the method includes:
sending the unicast packet and a single flow classification index to the packet transformer;
buffering the unicast packet in the memory associated with the packet transformer;
identifying transform control instructions for the unicast packet from the single flow classification index; and
transforming the unicast packet in accordance with the identified transform control instructions.

30. The method of claim 29 wherein when an incoming packet is identified as a unicast packet, the method further includes refraining from performing for the unicast packet:
sending the next of the flow classification indices without a packet to the packet transformer;
identifying next transform control instructions from the next of the flow classification indices; and
reading a packet from the memory; and transforming the packet in accordance with the next transform control instructions.

31. A method for packet multicasting comprising:
identifying a plurality of flow classification indices for a multicast packet;
sending the multicast packet and a first of the flow classification indices to a packet transformer;
buffering the multicast packet in a memory associated with the packet transformer;

identifying first transform control instructions from the first flow classification index;
transforming the multicast packet in accordance with the first transform control instructions;
identifying a single flow classification index for a unicast packet;
sending the unicast packet and a single flow classification index to the packet transformer;
buffering the unicast packet in the memory associated with the packet transformer;
identifying transform control instructions for the unicast packet from the single flow classification index; and
transforming the unicast packet in accordance with the identified transform control instructions.

32. The method of claim 31 further comprising:
sending a next of the flow classification indices without the multicast packet to the packet transformer;
identifying next transform control instructions from the next of the flow classification indices;
reading the multicast packet from the memory; and
transforming the multicast packet in accordance with the next transform control instructions.

33. The method of claim 32 further comprising repeating, for each of the flow classification indices of the plurality, the sending the next flow classification index, the identifying the next transform control instructions, the reading and the transforming the multicast packet, to generate multicast packets for transmission.

34. The method of claim 33 wherein prior to transforming, the method further comprises providing the multicast packet with each next flow classification index of the plurality to an egress processor, and wherein transforming further comprises transforming the multicast packet by the egress processor in accordance with each next flow classification index.

35. The method of claim 34 wherein a packet classifier performs identifying the plurality of flow classification indices, sending the multicast packet and the first flow classification index, and sending each next flow classification index without the multicast packet, and wherein the packet transformer performs the buffering, the identifying the transform control instructions and providing the multicast packet with each next flow classification index of the plurality to the egress processor.

36. The method of claim 35 wherein the packet classifier is comprised of a first multiprocessor system and the packet transformer is comprised of a second multiprocessor system which includes the egress processor.

37. The method of claim 31 wherein the flow classification index corresponds with a packet flow for a packet, and when the packet flow is a multicast packet, the method further comprises retrieving an additional flow classification index for each instance of multicasting, and sending each additional of the flow classification indices without the multicast packet to the packet transformer, wherein the flow classification indices include a descriptor to identify the flow as a multicast flow.

38. The method of claim 31 further comprising:
performing a hash on header portions of a received packet to determine a flow classification block index; and
looking up the flow classification block index in a flow classification block (FCB) to determine a flow classification index for a unicast packet and a location of the plurality of flow classification indices for the multicast packet.

39. The method of claim 31 wherein transforming includes replacing at least portions of a header of multicast packet with new portions, the new portions being in accordance with the transform control instructions.

40. The method of claim 31 wherein when an incoming packet is identified as a unicast packet, the method further includes refraining from performing for the unicast packet:
sending the next of the flow classification indices without a packet to the packet transformer;
identifying next transform control instructions from the next of the flow classification indices; and
reading a packet from the memory; and transforming the packet in accordance with the next transform control instructions.

41. A packet multicasting system comprising:
a packet transformer to transform a multicast packet in accordance with transform control instructions; and
a packet classifier to identify a plurality of flow classification indices for the multicast packet, and send the multicast packet and a first of the flow classification indices to the packet transformer, wherein the packet classifier sends a next of the flow classification indices without the multicast packet to the packet transformer, and the packet transformer identifies next transform control instructions from the next of the flow classification indices, reads the multicast packet from the memory and transforms the multicast packet in accordance with the next transform control instructions.

42. The system of claim 41 further comprising a memory associated with the packet transformer and wherein the packet transformer buffers the multicast packet in the memory after receipt of the multicast packet from the packet classifier.

43. The system of claim 41 wherein the packet classifier repeats, for each of the flow classification indices of the plurality, the sending the next flow classification index, and wherein the packet classifier repeats the identifying of the next transform control instructions, the reading and the transforming of the multicast packet, to generate multicast packets for transmission.

44. The system of claim 41 wherein the packet classifier performs a hash on header portions of a received packet to determine a flow classification block index, and looks up the flow classification block index in a flow classification block (FCB) to determine a flow classification index for a unicast packet and a location of the plurality of flow classification indices for the multicast packet.

45. The system of claim 41 wherein the packet transformer replaces at least portions of a header of multicast packet with new portions, the new portions being in accordance with the transform control instructions.

46. The system of claim 45 wherein the system is a packet routing system and the transformed packets are provide to a network for routing in accordance with the replaced headers.

47. The system of claim 41 wherein the packet classifier is comprised of a first multiprocessor system and the packet transformer is comprised of a second multiprocessor system.

48. A packet multicasting system comprising:
a packet transformer to transform a multicast packet in accordance with transform control instructions; and
a packet classifier to identify a plurality of flow classification indices for the multicast packet, and send the multicast packet and a first of the flow classification indices to the packet transformer, wherein the packet classifier performs a hash on header portions of a received packet to determine a flow classification block index, and looks up the flow classification block index in a flow classification block (FCB) to determine a flow classification index for a unicast packet and a location of the plurality of flow classification indices for the multicast packet.

49. The system of claim 48 further comprising a memory associated with the packet transformer and wherein the packet transformer buffers the multicast packet in the memory after receipt of the multicast packet from the packet classifier.

50. The system of claim 49 wherein the packet classifier sends a next of the flow classification indices without the multicast packet to the packet transformer, and the packet transformer identifying next transform control instructions from the next of the flow classification indices, reads the multicast packet from the memory and transforms the multicast packet in accordance with the next transform control instructions.

51. The system of claim 50 wherein the packet classifier repeats, for each of the flow classification indices of the plurality, the sending the next flow classification index, and wherein the packet classifier repeats the identifying the next transform control instructions, the reading and the transforming the multicast packet, to generate multicast packets for transmission.

52. The system of claim 48 wherein the packet transformer replaces at least portions of a header of multicast packet with new portions, the new portions being in accordance with the transform control instructions.

53. The system of claim 52 wherein the system is a packet routing system and the transformed packets are provide to a network for routing in accordance with the replaced headers.

54. The system of claim 48 wherein the packet classifier is comprised of a first multiprocessor system and the packet transformer is comprised of a second multiprocessor system.

55. A packet multicasting system comprising:
a packet transformer, comprised of a first multiprocessor system, to transform a multicast packet in accordance with transform control instructions; and
a packet classifier, comprised of a second multiprocessor system, to identify a plurality of flow classification indices for the multicast packet, and send the multicast packet and a first of the flow classification indices to the packet transformer.

56. The system of claim 55 further comprising a memory associated with the packet transformer and wherein the packet transformer buffers the multicast packet in the memory after receipt of the multicast packet from the packet classifier.

57. The system of claim 56 wherein the packet classifier sends a next of the flow classification indices without the multicast packet to the packet transformer, and the packet transformer identifying next transform control instructions from the next of the flow classification indices, reads the multicast packet from the memory and transforms the multicast packet in accordance with the next transform control instructions.

58. The system of claim 57 wherein the packet classifier repeats, for each of the flow classification indices of the plurality, the sending the next flow classification index, and wherein the packet classifier repeats the identifying the next transform control instructions, the reading and the transforming the multicast packet, to generate multicast packets for transmission.

59. The system of claim 55 wherein the packet classifier performs a hash on header portions of a received packet to determine a flow classification block index, and looks up the flow classification block index in a flow classification block (FCB) to determine a flow classification index for a unicast packet and a location of the plurality of flow classification indices for the multicast packet.

60. The system of claim 55 wherein the packet transformer replaces at least portions of a header of multicast packet with new portions, the new portions being in accordance with the transform control instructions.

61. The system of claim 60 wherein the system is a packet routing system and the transformed packets are provide to a network for routing in accordance with the replaced headers.

62. In a virtual routing system having a plurality of virtual routers (VRs) instantiated by a virtual routing engine (VRE), wherein the instantiation of each VR includes an associated routing context, a method of multicasting packets comprising:
receiving a first multicast packet and a second multicast packet from a same service provider, wherein the first received multicast packet and the second received multicast packet have identical layer-two through layer-four (L2-L4) headers;
classifying the first received multicast packet and the second received multicast packet in accordance with different VRs of the plurality of VRs by determining a first selected VR of the plurality of VRs to multicast the first received multicast packet and a second selected VR of the plurality of VRs to multicast the second received multicast packet;
switching a routing context of the VRE to a routing context associated with the first selected VR for the first received multicast packet; and
reading at least a portion of the first received multicast packet from one of a plurality of multicast address spaces associated with the first selected VR to multicast the first received multicast packet;
forwarding the first received multicast packet to a first set of multicast destinations;
switching the routing context of the VRE to a routing context associated with the second selected VR for the second received multicast packet;
reading at least a portion of the second received multicast packet from a plurality of multicast address spaces associated with the second selected VR to multicast the first received multicast packet; and
forwarding the second received multicast packet to a second set of multicast destinations.

63. The method of claim 62 further comprising:
transforming headers of the first received multicast packet in accordance with transform control instructions of the routing context associated with the first received multicast packet; and
transforming headers of the second received multicast packet in accordance with transform control instructions of the routing context associated with the second received multicast packet.

64. The method of claim 62 wherein during reading, multicast packets is read from a same buffer of the multicast address spaces associated with the selected VR for each instance of multicasting.

65. The method of claim 62 wherein switching the routing context of a VR includes switching a memory state of the VRE, and wherein the virtual routing system includes a plurality of VREs, each capable of instantiating a plurality of VRs.

66. The method of claim 62 further comprising:
identifying a plurality of flow classification indices for a received packet;
sending the received packet and a first of the flow classification indices to a packet transformer;

buffering the received packet in a memory associated with the packet transformer;
identifying first transform control instructions from the first flow classification index; and
transforming the received packet in accordance with the first transform control instructions.

67. The method of claim 66 further comprising:
sending a next of the flow classification indices without the received packet to the packet transformer;
identifying next transform control instructions from the next of the flow classification indices;
reading the received packet from the memory;
transforming the received packet in accordance with the next transform control instructions; and
repeating, for each of the flow classification indices of the plurality, the sending the next flow classification index, the identifying the next transform control instructions, the reading and the transforming the received packet, to generate multicast packets for transmission.

68. The method of claim 67 wherein prior to transforming, the method further comprises providing the received packet with each next flow classification index of the plurality to an egress processor, and
wherein transforming further comprises transforming the received packet by the egress processor in accordance with each next flow classification index, and
wherein a packet classifier performs identifying the plurality of flow classification indices, sending the received packet and the first flow classification index, and sending each next flow classification index without the received packet, and
wherein the packet transformer performs the buffering, the identifying the transform control instructions and providing the received packet with each next flow classification index of the plurality to the egress processor.

69. The article of claim 2 wherein the computer-readable instructions further result in during reading, the multicast packet is read from a same buffer for each instance of multicasting.

70. The article of claim 2 wherein the computer-readable instructions further result in:
identifying a plurality of flow classification indices for the multicast packet;
sending the multicast packet and a first of the flow classification indices to a packet transformer;
buffering the multicast packet in a memory associated with the packet transformer;
identifying first transform control instructions from the first flow classification index; and
transforming the multicast packet in accordance with the first transform control instructions.

71. The article of claim 70 wherein the computer-readable instructions further result in:
sending a next of the flow classification indices without the multicast packet to the packet transformer;
identifying next transform control instructions from the next of the flow classification indices;
reading the multicast packet from the memory;
transforming the multicast packet in accordance with the next transform control instructions; and
repeating, for each of the flow classification indices of the plurality, the sending the next flow classification index, the identifying of the next transform control instructions, the reading and the transforming of the multicast packet, to generate multicast packets for transmission.

72. The article of claim 71 wherein the computer-readable instructions further result in prior to transforming, providing the multicast packet with each next flow classification index of the plurality to an egress processor of the computing platform, and
wherein transforming further comprises transforming the multicast packet by the egress processor in accordance with each next flow classification index, and
wherein a packet classifier performs identifying the plurality of flow classification indices, sending the multicast packet and the first flow classification index, and sending each next flow classification index without the multicast packet, and
wherein the packet transformer performs the buffering, the identifying of the transform control instructions and providing the multicast packet with each next flow classification index of the plurality to the egress processor.

* * * * *